United States Patent [19]

Kishi et al.

[11] 4,388,845
[45] Jun. 21, 1983

[54] LINE PRESSURE CONTROL DEVICE OF AN AUTOMATIC TRANSMISSION

[75] Inventors: Norimasa Kishi, Yokosuka; Shigeaki Yamamuro, Zushi, both of Japan

[73] Assignee: Nissan Motor Co., Ltd., Yokohama, Japan

[21] Appl. No.: 136,337

[22] Filed: Apr. 1, 1980

[30] Foreign Application Priority Data

Apr. 5, 1979 [JP] Japan ................................ 54-41345

[51] Int. Cl.³ .............................................. B60K 41/04
[52] U.S. Cl. ........................................ 74/862; 74/866
[58] Field of Search .............. 74/862, 863, 864, 861, 74/856, 866

[56] References Cited

U.S. PATENT DOCUMENTS

| | | | |
|---|---|---|---|
| 2,990,041 | 6/1961 | Binder | 192/3.5 |
| 3,324,738 | 6/1967 | Olsen et al. | 74/172 |
| 3,621,735 | 11/1971 | Lemieux | 74/866 X |
| 3,675,511 | 7/1972 | Wakamatsu | 74/866 |
| 3,693,479 | 9/1972 | Toyoda | 74/866 X |
| 3,738,197 | 6/1973 | Brumm et al. | |
| 4,027,554 | 6/1977 | Ito | 74/866 |
| 4,106,367 | 8/1978 | Bouvet | |
| 4,107,776 | 8/1978 | Beale | 74/866 X |
| 4,131,035 | 12/1978 | Mizuno | 74/866 |
| 4,172,505 | 10/1979 | Rabus | 74/862 X |
| 4,231,092 | 10/1980 | Grob | 74/866 X |
| 4,259,882 | 4/1981 | Miller | 74/866 X |

FOREIGN PATENT DOCUMENTS

| | | |
|---|---|---|
| 1137960 | of 0000 | Fed. Rep. of Germany . |
| 2112804 | of 0000 | Fed. Rep. of Germany . |
| 2544727 | of 0000 | Fed. Rep. of Germany . |
| 1400183 | 7/1965 | United Kingdom . |
| 1314372 | 4/1973 | United Kingdom . |

Primary Examiner—Nile C. Byers, Jr.
Attorney, Agent, or Firm—Lane, Aitken, Kice & Kananen

[57] ABSTRACT

In a line pressure control device of an automatic transmission for vehicle a circuit is provided for generating a target line pressure signal corresponding an actually measured load signal obtained from an engine load sensor. A line pressure sensor generates an actually measured line pressure signal corresponding to the line pressure. A converter converts the target line pressure signal and the actually measured line pressure signal into upper limit line pressure signals and lower limit line pressure signals which are set given amounts above and below the target signal and the actually measured signal respectively. A decision circuit compares the upper and lower limit line pressure signals drives and properly driving and controls the hydraulic pressure adjusting valve in accordance with the result of the comparison.

6 Claims, 17 Drawing Figures

LINE PRESSURE CONTROL DEVICE OF AN AUTOMATIC TRANSMISSION

BACKGROUND OF THE INVENTION

The present invention relates to an improved line pressure control device of an automatic transmission for vehicle.

In an automatic transmission line pressure for a actuating oil from an oil pump driven by the engine is usually controlled to be a predetermined oil pressure by a line pressure adjusting valve. Manifold negative pressure from the engine is introduced into a vacuum diaphragm of a throttle valve to generate a throttle pressure corresponding to the engine load. A governor pressure corresponding to a vehicle speed is generated from the line pressure through a governor secured to an output shaft of the automatic transmission. A hydraulic pressure change-over valve is activated (shift valve) by the throttle pressure and the governor pressure and, properly supplies the line pressure to friction elements such as a clutch, a brake and the like for changing over a power transmission route of a pair of planetary gears, and performs automatic transmission operation. The throttle pressure is also introduced into the line pressure adjusting valve so as to adjust the line pressure corresponding to the load of the engine, so that the friction elements actuated by the line pressure do not produce any slippage.

Exahust gas from automobiles is now strictly regulated and a countermeasure to control exhaust gas to meet standards from each car is necessary. Under the influence of, for example, an exhaust reflux device for returning a part of exhaust gas to an engine inlet system, the engine manifold negative pressure does not precisely correspond to the load of the engine. In the above-described prior automatic transmission, therefore, the line pressure adjusted by the manifold negative pressure will not correspond to the load of the engine and the line pressure becomes too great or too little compared to the load of the engine. As a result, the clamping force of the friction element actuated by the line pressure becomes too large producing a transmission shock or the clamping or coupling force is too weak making the friction element slip. Because of these disadvantages the engine output is not effectively utilized, fuel expense becomes greater and the friction element is damaged.

It has been proposed in an automatic transmission not to directly introduce the manifold negative pressure into the vacuum diaphragm of the throttle valve controlling the line pressure. Instead a negative pressure corresponding to the degree of throttle opening (accelerator pedal depression amount) representing the load of the engine is produced, and the negative pressure is introduced into the vacuum diaphragm for the purpose of avoiding the above described disadvantages.

Figure 1:
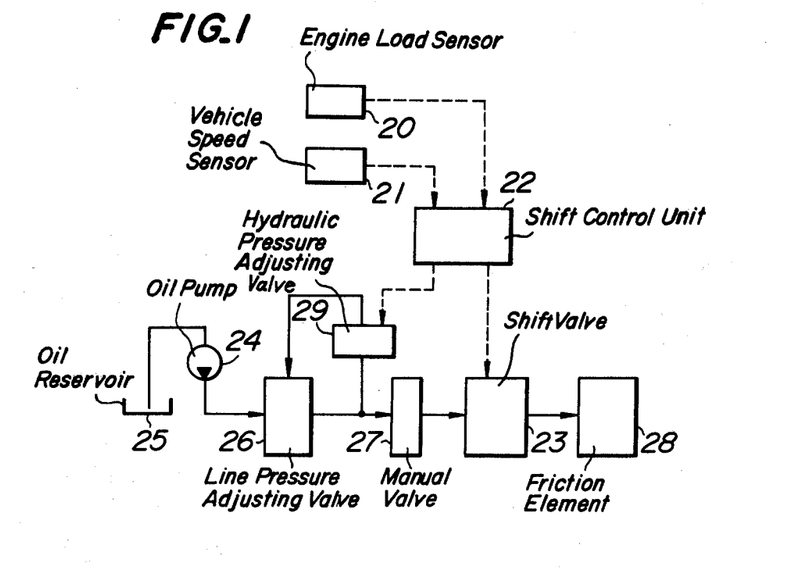
FIG. 1 is a block diagram showing a vehicle speed control system of an electronic control type automatic transmission.

An example of such an automatic transmission with an electronic control is shown in FIG. 1. In the system of FIG. 1, the throttle opening degree, manifold negative pressure, inlet air amount or fuel injection amount and the like are detected. A signal corresponding to the load of the engine is supplied from engine load sensor 20 and a signal corresponding to a car or vehicle speed is supplied from a vehicle speed sensor 21 to a shift control unit 22, respectively, and the shift control unit 22 properly actuates the shift valves 23 in response to these input signals. An oil pump 24 driven by the engine sucks and exhausts actuating oil from an oil reservoir 25. The actuating oil is adjusted to a line pressure by a line pressure adjusting valve 26 and is constantly supplied to a manual valve 27. When a driver operates the manual valve 27 to an operating range, the line pressure is introduced into a shift valve selected from the shift valves 23, and the shift control unit 22 selects and actuates the shift valves 23 in accordance with the driving state of the automobile, so that the line pressure is supplied to one of the friction elements, 28, actuates this friction element and carries out automatic transmission operation.

Figure 2:
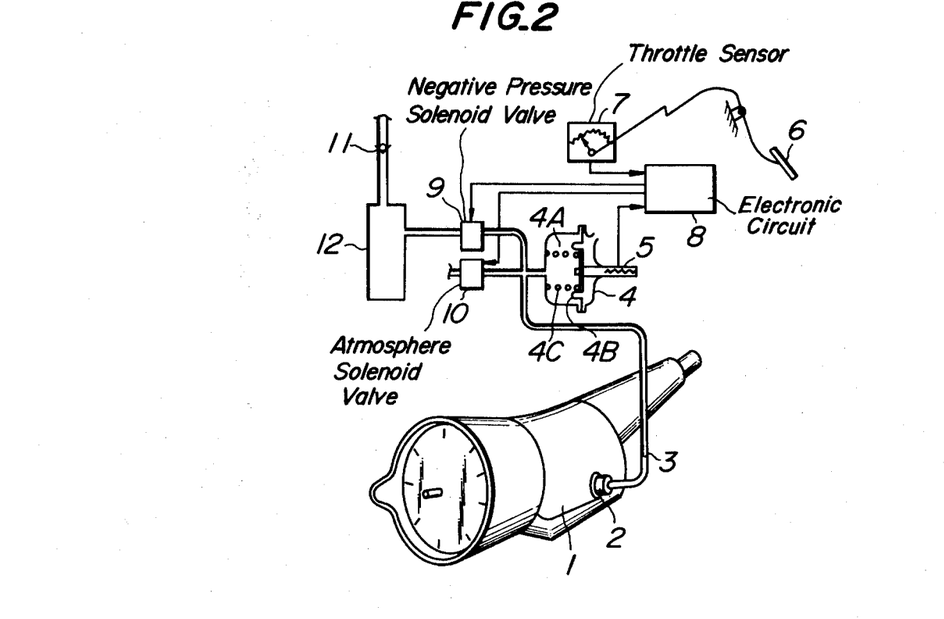
FIG. 2 is a diagram showing a line pressure control system used in the system shown in FIG. 1.
Figure 3:
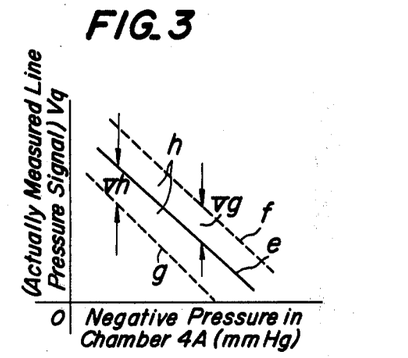
FIG. 3 is a characteristic diagram showing the variation of an actually measured line pressure signal with pressure in a diaphragm device.
Figure 4:
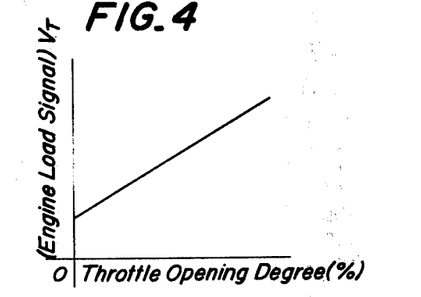
FIG. 4 is a characteristic diagram showing the variation of an engine load signal with throttle opening.
Figure 5:
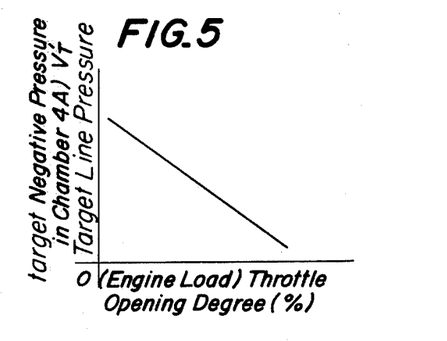
FIG. 5 is a characteristic diagram showing the variation target line pressure with engine load.

The shift control unit 22 applies the engine load signal to a hydraulic pressure adjusting valve (vacuum throttle valve) 29. The hydraulic pressure adjusting valve 29 produces a hydraulic pressure corresponding to the engine load acting on the line pressure adjusting valve 26 in accordance with the engine load signal, operates on the line pressure adjusting valve 26 and functions to make the line pressure precisely correspond to the magnitude of the engine load. A line pressure control system is represented in FIG. 2 in more detail. The block 29 of FIG. 1 identified by the legend hydraulic pressure adjusting valve includes a vacuum diaphragm 2, a negative pressure conduit 3, a diaphragm device 4, a negative pressure solenoid valve 9 and an atmospheric pressure solenoid valve 10 in addition to the hydraulic pressure adjusting valve provided in the automatic transmission body 1. An electronic circuit 8 (FIG. 2) is provided within the shift control unit 22 shown in FIG. 1. The vacuum diaphragm 2 receives a negative pressure in the negative pressure chamber 4A of the diaphragm device 4 through the conduit 3. This negative pressure actuates the hydraulic pressure ajdusting valve through the vacuum diaphragm 2 and adjusts the line pressure as described above, so that the magnitude of the negative pressure (absolute value) corresponds to the line pressure in inverse proportion. The negative pressure in the chamber 4A is electrically detected as a line pressure signal by means of a line pressure sensor operated in response to the displacement of the diaphragm device 4 and comprising a variable resistor or the like. The amount of depression pedal 6 of the vehicle accelerator corresponding to the engine load, is electrically detected by a throttle sensor 7 comprising a variable resistor or the like and the throttle sensor is used as an engine load sensor. An actually measured line pressure signal $V_q$ and an engine load signal $V_T$ from the line pressure sensor 5 and the throttle sensor 7 vary, respectively, as shown in FIGS. 3 and 4. These signals are supplied to the electronic circuit 8. The electronic circuit 8 compares the signal $V_q$ representing the line pressure with the signal $V_T$ representing the engine load and determines whether the signal $V_q$ corresponds to the ideal line pressure as shown by the graph in FIG. 5. When the line pressure uses above the ideal value (i.e., the actually measured line pressure signal $V_q$ is larger than a target negative pressure $V_{T'}$), the negative pressure solenoid valve 9 is opened by supplying a signal thereto. A vacuum tank 12 storing the negative pressure from the engine manifold through a check valve 11 will then supplement the negative pressure to the vacuum diaphragm 2 so as to actuate the hydraulic pressure adjusting valve to decrease the line pressure. In the opposite case, the atmospheric pressure solenoid valve 10 is opened by supplying a signal thereto and the hydraulic pressure adjusting valve is actuated to increase the line pressure. As a result, the line pressure is controlled along target characteristics shown in FIG. 5 to correspond to the engine load, and even if the manifold negative pressure does not precisely correspond to the engine load due to the exhaust gas countermeasure, the automatic transmission can be controlled as desired.

In such an automatic transmission, however, when a diaphragm 4B of the diaphragm 4 does not promptly stop at a balanced position between the negative pressure and a spring 4C during the above described operation, but over shoots, the operational stability of the control system suffers the amount of power consumption by the solenoids valve 9, 10 is increased and the amount of negative pressure consumption in the vacuum tank 12 is increased.

In order to solve this problem, stabilizing the control system by providing a dead zone for inactivating both the solenoids 9 and 10 has been considered, but this kind of conventional countermeasure only provides a dead zone on the + side or − side to the target value, so that the over shoot in the vicinity of the target value is prevented in one direction but not in the opposite direction. As a result, the problem is not always avoided and the actual target value is not achieved. Moreover, it has hitherto been considered to provide a pulse width for determining the opening time of the solenoids 9, 10 in accordance with the magnitude of deviation of the actually measured value from the target value, thereby improving the response of the control system and promptly positioning the actually measured value in the dead zone. However, in this case, the dead zone is set only on one side of the target value as described above and being the deviation is measured with the target value being a boundary value of the dead zone. For this reason, controlling the pulse width in accordance with deviation for the actually measured value in does not tend to promptly position the dead zone in the strict sense, and these countermeasures do not always attain the desired object.

SUMMARY OF THE INVENTION

An object of the present invention is to eliminate the above described disadvantages of the conventional line pressure control device of automatic transmission.

Another object of the present invention is to provide a line pressure control device in an automatic transmission which sets the dead zone on both sides, i.e. at the + side and the − side of the actually measured line pressure or the target line pressure.

Another object of the present invention is to provide a line pressure control device of an automatic transmission in which the deviation is obtained by comparing the actually measured line pressure as a value in the dead zone with the target line pressure instead of comparing the actually measured line pressure as a boundary value to determine the dead zone with the target line pressure.

According to the present invention, the line pressure control device of an automatic transmission comprises a pair of planetary gears, a plurality of friction elements for determining a power transmission route of the pair of the planetary gears, an engine load sensor for generating a signal corresponding to the engine load, a speed sensor for generating a signal corresponding to the running speed of a vehicle, an oil pump driven by the vehicle engine, a line pressure adjusting valve for producing a line pressure by adjusting actuating oil from the oil pump to a predetermined hydraulic pressure, a hydraulic pressure adjusting valve for producing a controlled hydrualic pressure acting on the line pressure adjusting valve and adjusting the line pressure to a value corresponding to the engine load through the line pressure adjusting valve, a hydraulic pressure change-over valve for supplying the line pressure to either one of said friction elements, a circuit for obtaining a corresponding target line pressure signal from an actually measured load signal obtained from the engine load sensor, a line pressure sensor for generating an actually measured line pressure signal corresponding to the line pressure, a converter means for converting at least one of the target pressure signal and the actually measured line pressure signal into an upper limit line pressure signal and a lower limit line pressure signal which are set above and below the target signal or actually measured signal by given amounts, respectively, and a decision circuit for comparing the upper and lower limit line pressure signals with the other of the target line pressure signal and the actually measured line pressure signal and properly driving and controlling the hydraulic pressure adjusting valve in accordance with the result of the comparison.

A line pressure control device of an automatic transmission according to the present invention comprises a pair of planetary gears, a plurality of friction elements for determining a power transmission route of the pair of the planetary gears, an engine load sensor for generating a signal corresponding to the engine load, a speed sensor for generating a signal corresponding to the running speed of a vehicle, an oil pump driven by an engine, a line pressure adjusting valve for producing a line pressure by adjusting actuating oil from the oil pump to a predetermined hydraulic pressure, a hydraulic pressure adjusting valve for producing a controlled hydraulic pressure acting on the line pressure and adjusting the line pressure to a valve corresponding to the engine load through the line pressure adjusting valve, a hydraulic pressure change-over valve for supplying the line pressure to either one of the friction elements, a circuit for obtaining a corresponding aim line pressure signal from an actually measured load signal obtained from the engine load sensor, a first converter means for converting the target line pressure signal into a target upper limit line pressure signal and a target lower limit line pressure singal which are set above and below the target line pressure signal by given amounts, a line pressure sensor for generating an actually measured line pressure signal corresponding to the line pressure, a second converter means for converting the actually measured line pressure signal from the line pressure sensor into an actually measured upper limit line pressure signal and an actually measured lower limit line pressure signal which differ therefrom by given amounts, respectively, and a decision circuit for generating a signal applied to the hydraulic pressure adjusting valve by decreasing the line pressure when the actually measured lower limit line pressure signal exceeds the target upper limit line pressure signal by comparing the target upper limit pressure signal with the actually measured lower limit line pressure signal and generating a signal applied to the hydraulic pressure adjusting valve for increasing the line pressure when the actually measured upper limit line pressure signal is lower than the target lower limit line pressure signal by comparing the target lower limit line pressure signal with the actually measured upper limit line pressure signal.

DESCRIPTION OF THE PREFERRED EMBODIMENTS

Referring to the drawings preferred embodiments of a line pressure control device of an automatic transmission according to the present invention will be explained.

Figure 6:
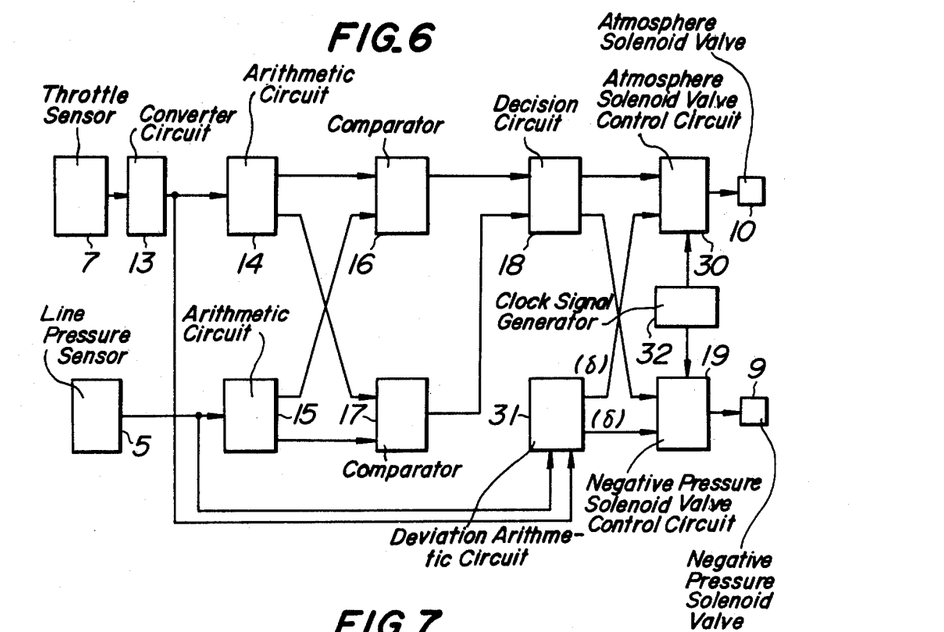
FIG. 6 is the block diagram showing a construction of a line pressure control device according to the present invention.
Figure 7:
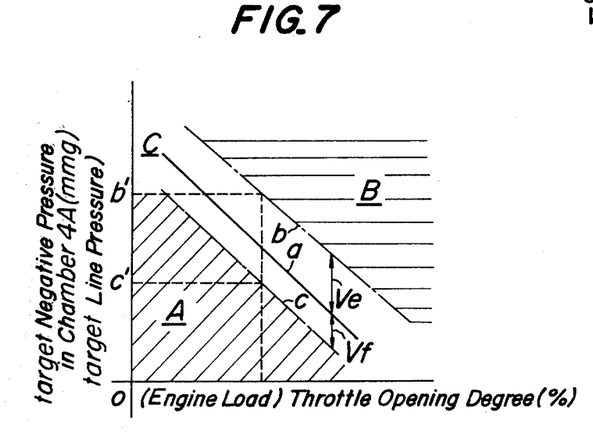
FIG. 7 is a diagram showing a dead zone set for target line pressure.

FIG. 6 shows the fundamental construction of a line pressure control device according to the present invention. A signal representing the degree of throttle opening corresponding to the engine load from the throttle sensor 7 is converted into a target line pressure signal representing the ideal line pressure by a converter circuit 13. The target line pressure signal is produced by the converter 13 from the signal representing the degree of throttle opening in accordance with the graph of FIG. 5 or the line a in the graph of FIG. 7. The target line pressure signal is supplied to an arithmetic circuit 14. The arithmetic circuit 14, as shown by b and c in FIG. 7, provides a dead zone C with a predetermined width on both sides, i.e. at the + side and the − side of the target line pressure signal. The arithmetic unit adds a value to the target line pressure signal and subtracts a value from the target line pressure signal to determine the dead zone limits. These values to be added and subtracted are determined from a table look-up for the target line pressure signal. In this manner the dead zone having a certain width on both sides of the target line pressure signal is set, so that the arithmetic circuit 14 generates a target upper limit line pressure signal (for example, b') and a target lower limit line pressure signal (for example, c') in accordance with each throttle opening degree (engine load).

The actually measured line pressure signal from the line pressure sensor 5 is supplied to an arithmetic circuit 15, where a dead zone having a certain width on both sides of the actually measured line pressure signal is provided in the same manner as in the arithmetic circuit 14, and the arithmetic circuit 15 generates an actually measured upper limit line pressure signal and an actually measured lower limit line pressure signal.

The target upper limit line pressure signal from the arithmetic circuit 14 is compared with the actually measured lower limit line pressure signal from the arithmetic circuit 15 by a comparator 16. The target lower limit line pressure signal from the arithmetic circuit 14 is compared with the actually measured upper limit line pressure signal from the arithmetic circuit 15 by a comparator 17. The respective comparators supply signals indicating which input signal is large, small or equal to a decision circuit 18. The decision circuit 18 receives signals from both the comparators 16 and 17, and when the actually measured lower limit line pressure signal becomes larger than the target upper limit line pressure signal (when the actually measured lower limit pressure signal enters region B shown in FIG. 7), that is, when the actually measured lower limit line pressure exceeds the dead zone of the target value, the decision circuit 18 generates a signal to a control circuit 19 for opening the negative pressure solenoid valve 9. When the actually measured upper limit line pressure signal becomes smaller than the target lower limit line pressure signal (when the actually measured upper limit pressure signal enters region A shown in FIG. 7), that is, when the actually measured upper limit line pressure falls below the dead zone of the target value, the decision circuit 18 generates a signal to a control circuit 30 for opening the atmospheric pressure solenoid valve 10. The decision circuit 18 closes both the solenoid valves 9, 10 in other regions (when either one of the actually measured upper limit or lower limit line pressures is in the dead zone C). Thus, the line pressure is adjusted to the target value (refer to FIG. 5) corresponding to the engine load by such control of the solenoid valves 9, 10 as described above. The dead zones are set on both sides for both the target value and the actually measured value in this case, so that the over shoot of the diaphragm 4B (refer to FIG. 2) is not produced in any direction. Thus, consuming power of the solenoid valves 9, 10 can be decreased by stabilizing the control system, the negative pressure of the vacuum tank 12 is not wastefully consumed, and there is no deviation of the target value.

Figure 8:
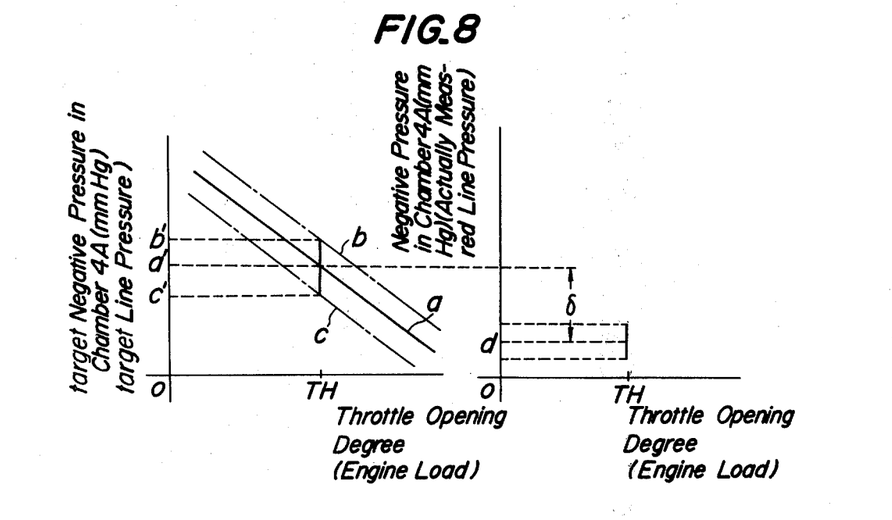
FIG. 8 is a diagram showing how to obtain the deviation of the actually measured line pressure from the target line pressure.
Figure 9:
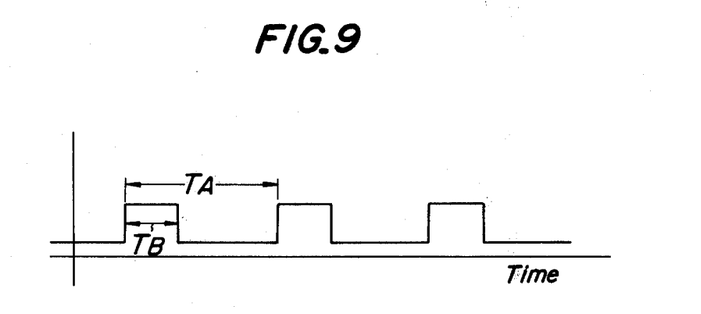
FIG. 9 is a diagram showing a pulse signal for driving a solenoid valve in accordance with the deviation.

The target line pressure signal from the converter circuit 13 and the actually measured line pressure signal from the line pressure sensor 5 are also supplied to a deviation arithmetic circuit 31. The deviation arithmetic circuit 31 compares the target line pressure with the actually measured line pressure from both the applied signals and determines the difference or deviation. The circuit 31 supplies a signal representing the magnitude of this deviation to the control circuits 19, 30. For example, if, as shown in FIG. 8, the throttle opening is TH and the actually measured line pressure is d, then the circuit 31 will produce an output signal representing the deviation δ. A clock signal generator 32 supplies a reference time $T_A$ shown in FIG. 9 to the control circuits 19, 30. These control circuits determine an ON time $T_B$ of a duty cycle as shown for example in FIG. 9 in accordance with a predetermined function of the deviation $\delta$, and the solenoid valves 9, 10 are opened during the ON time only. The control circuits 9, 10 determine the opening time of the solenoid valves 9, 10 in the above described operation, respectively, in a duty cycle in which the larger the deviation $\delta$, the longer the opening time $T_B$ of the solenoids 9, 10, while the smaller the deviation $\delta$, the shorter the opening time $T_B$ of the solenoids 9, 10, so as to precisely carry out the operation and to improve its response. In this method the difference between the actually measured line pressure and the target line pressure, which is within the dead zone, is determined as the deviation, so that this deviation becomes a precise reference value for promptly bringing the actually measured line pressure into the dead zone, and the object for improving the response of the control system can positively be attained.

Figure 10:
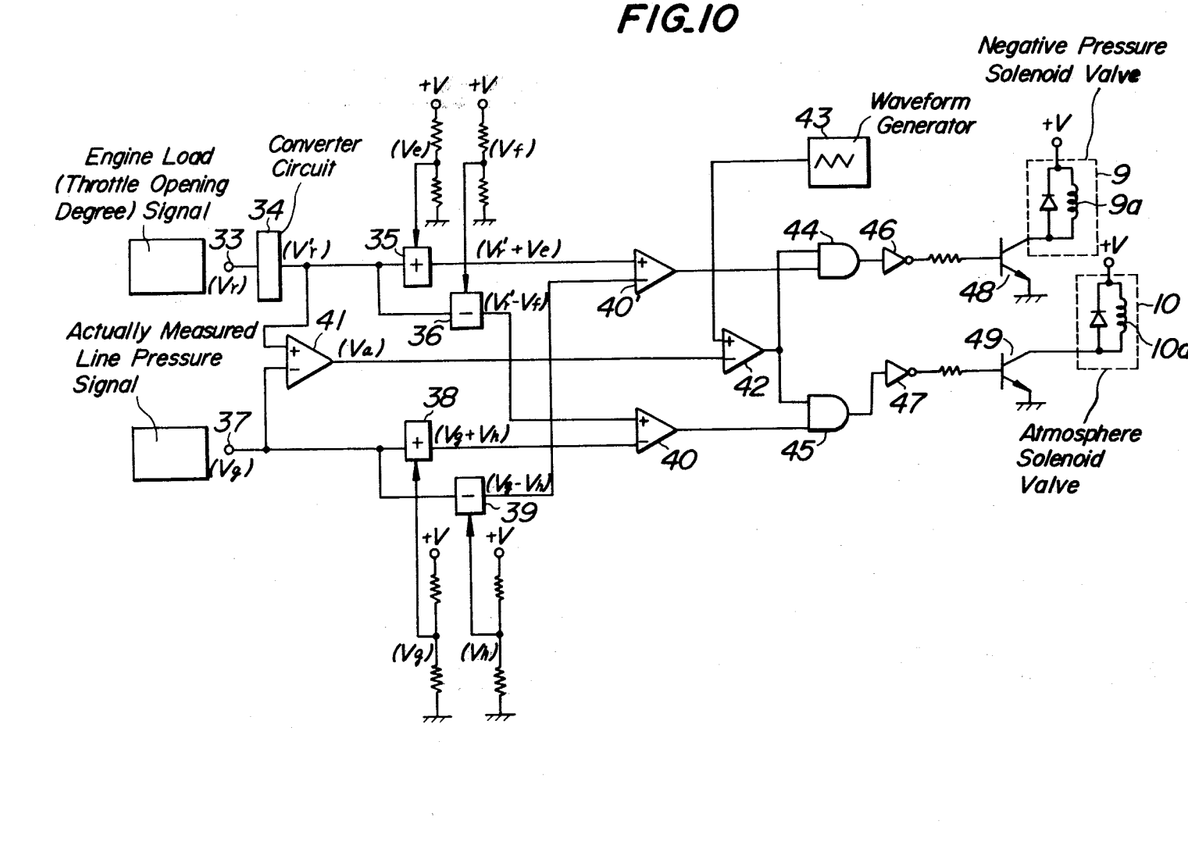
FIG. 10 is a circuit diagram showing an embodiment of the line pressure control device according to the present invention constructed as an analog circuit.

FIG. 10 shows a constructional embodiment of the device according to the present invention by using an analog circuit. An engine load signal $V_T$ (throttle opening degree signal) from the throttle sensor 7 (refer to FIGS. 2 and 6) supplied to a terminal 33 is converted into a target line pressure signal $V_T'$, in accordance with the graph shown in FIG. 5 and designated a in FIG. 7, by a converter circuit 34. This target line pressure signal $V_T'$ is added to a voltage $V_e$ by an adder 35 to become an target upper limit line pressure signal (refer to b in FIG. 7) of $V_T'+V_e$, and a subtractor 36 subtracts a voltage $V_f$ from the signal $V_T'$ to become an target lower limit line pressure signal (refer to c in FIG. 7) of $V_T'-V_f$. Therefore, the target line pressure signal $V_T'$ sets the dead zone C shown in FIG. 7 on both sides thereof, i.e. at the + side and the − side thereof.

An input terminal 37 receives an actually measured line pressure signal $V_q$ (refer to e in FIG. 3) from the line pressure sensor 5 (refer to FIGS. 2 and 6). This actually measured line pressure signal $V_q$ is added to a voltage $V_g$ by an adder 38 to become an actually measured upper limit line pressure signal (corresponding to f in FIG. 3) of $V_q+V_g$, and a voltage $V_h$ is subtracted from $V_q$ by a subtractor 39 to become an actually measured lower limit line pressure signal (refer to g in FIG. 3) of $V_q-V_h$. Therefore, the actually measured line pressure signal $V_q$ sets a dead zone h shown in FIG. 3 on both sides thereof, i.e. at the + side and the − side thereof.

The target upper limit line pressure signal $V_T'+V_e$ and the actually measured lower limit line pressure signal $V_q-V_h$ are supplied to a comparator 40′, and the target lower limit line pressure signal $V_T'-V_f$ and the actually measured upper limit line pressure signal $V_q+V_g$ are supplied to a comparator 40. The comparator 40′ generates a signal with the amplitude level (H) when $V_q-V_h > V_T'+V_e$, and the comparator 40 generates a signal with the amplitude level (H) when $V_q+V_g < V_T'-V_f$. Both the comparators 40′ and 40 generate a signal of the low amplitude (L), respectively, when the above conditions do not occur.

Figure 11:
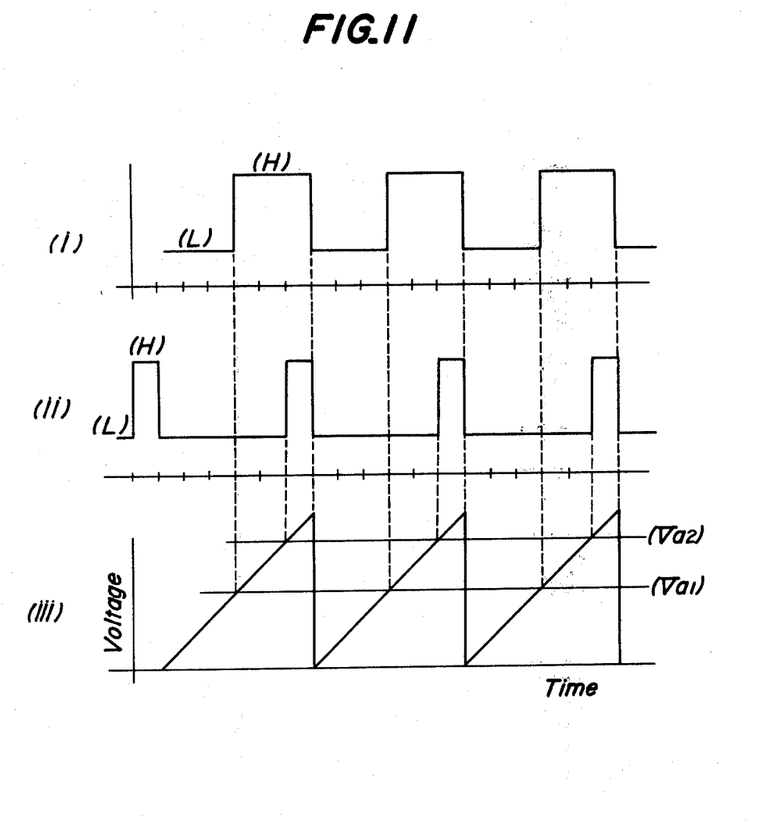
FIG. 11 is a diagram showing how to obtain a pulse signal for driving a solenoid valve in accordance with the deviation.

The target line pressure signal $V_T'$ and the actually measured line pressure signal $V_q$ are supplied to a comparator 41, where both the signals are compared with each other, and a signal $V_a$ corresponding to the deviation $\delta$ of the actually measured line pressure from the target line pressure is generated, and this signal $V_a$ is supplied to a comparator 42. The comparator 42 receives a saw-tooth wave or triangular wave shown in FIG. 11 (iii) from a waveform generator 43. The comparator 42 compares this waveform with the deviation signal $V_a$, and the comparator produces a high signal level output (H) whenever the sawtooth signal amplitude is greater than the amplitude of the deviation signal $V_a$ and produces a low signal level output (L) whenever the sawtooth signal amplitude is less than the amplitude of the deviation signal. Thus, if the deviation signal $V_a$ is low (the deviation $\delta$ is small) for example shown by $V_{a1}$ in FIG. 11 (iii), a pulse signal shown in FIG. 11 (i) is supplied to AND gates 44, 45, while if the deviation signal $V_a$ is high (the deviation $\delta$ is large) for example shown by $V_{a2}$ in FIG. 11 (ii), a pulse signal shown in FIG. 11 (ii) is supplied to the AND gates 44, 45.

The AND gates 44, 45 receive signals from the comparators 40′, 40, and the corresponding AND gate 44 or 45 generates the pulse signal when a signal from the comparator 40′ or 40 is at the H level. This pulse signal is inverted by connecting inverters 46, 47 to output terminals of the AND gates 44, 45 because the larger the deviation signal $V_a$ (deviation $\delta$), the longer the time of the L level at the output of the AND gates 44, 45. The converters 46, 47 make the time of the H level longer and the time of the L level shorter as the deviation signal $V_a$ (deviation $\delta$) increases.

The inverted pulse signal is supplied to the bases of transistors 48, 49, which act as switches controlling current to the coils 9a, 10a of the negative pressure solenoid valve 9 and the atmospheric pressure solenoid valve 10. The transistors 48, 49 are rendered conductive during intervals corresponding to the H level of the pulse signal so as to open the solenoid valves 9, 10.

As described above, the line pressure control device according to the invention shown in FIG. 10 can open the negative pressure solenoid valve 9 during the H level interval of the pulse signal corresponding to the magnitude of the deviation signal $V_a$, which in turn corresponds to the deviation $\delta$ when the actually measured lower limit line pressure signal $V_q-V_g$ exceeds the target upper limit line pressure signal $V_T'+V_e$, so as to promptly and precisely decrease the line pressure to the target value as described in the above embodiment, and can open the atmospheric pressure solenoid valve 10 during the L level interval of the pulse signal corresponding to the magnitude of the deviation signal $V_a$, which in turn corresponds to the deviation $\delta$ when the actually measured upper limit line pressure signal $V_q+V_g$ is lower than the target lower limit line pressure signal $V_T'-V_f$, so as to promptly and precisely increase the line pressure to the target value as described in the above embodiment.

The device according to the present invention shown in FIG. 10 can set dead zones on both sides for the target value and the actually measured value, so that a difference between the actually measured line pressure and the target line pressure, which is within the dead zone, can be used as the deviation, and the same function and effect described in reference to FIG. 6 can be obtained.

Figure 12:
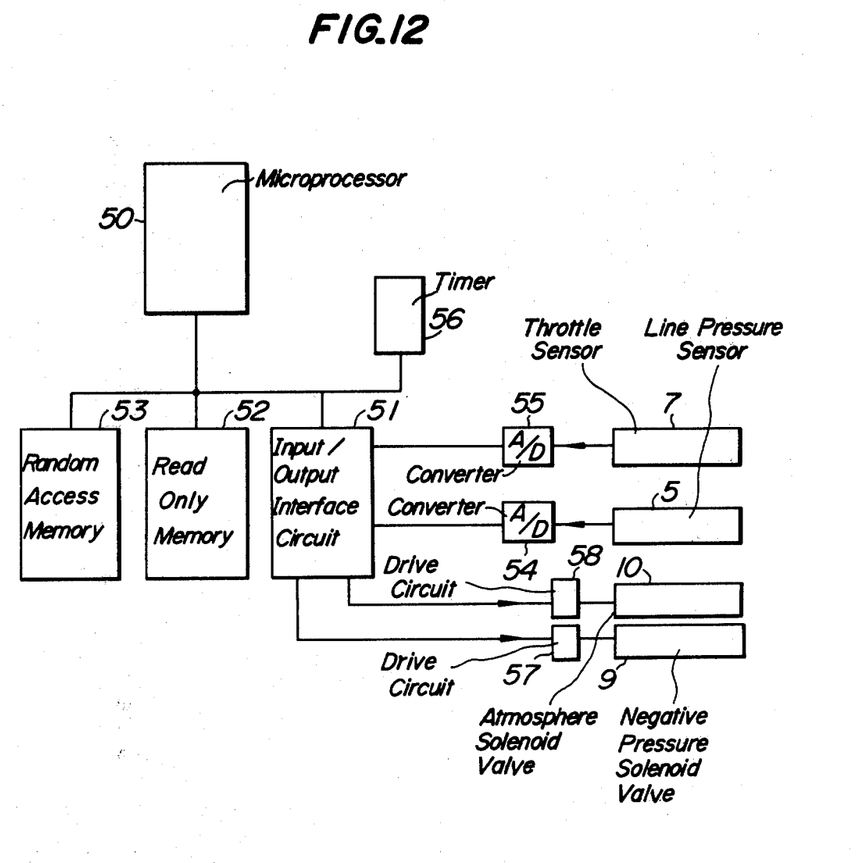
FIG. 12 is a block diagram showing the line pressure control device according to the present invention constructed by using a microcomputer.
Figure 13:
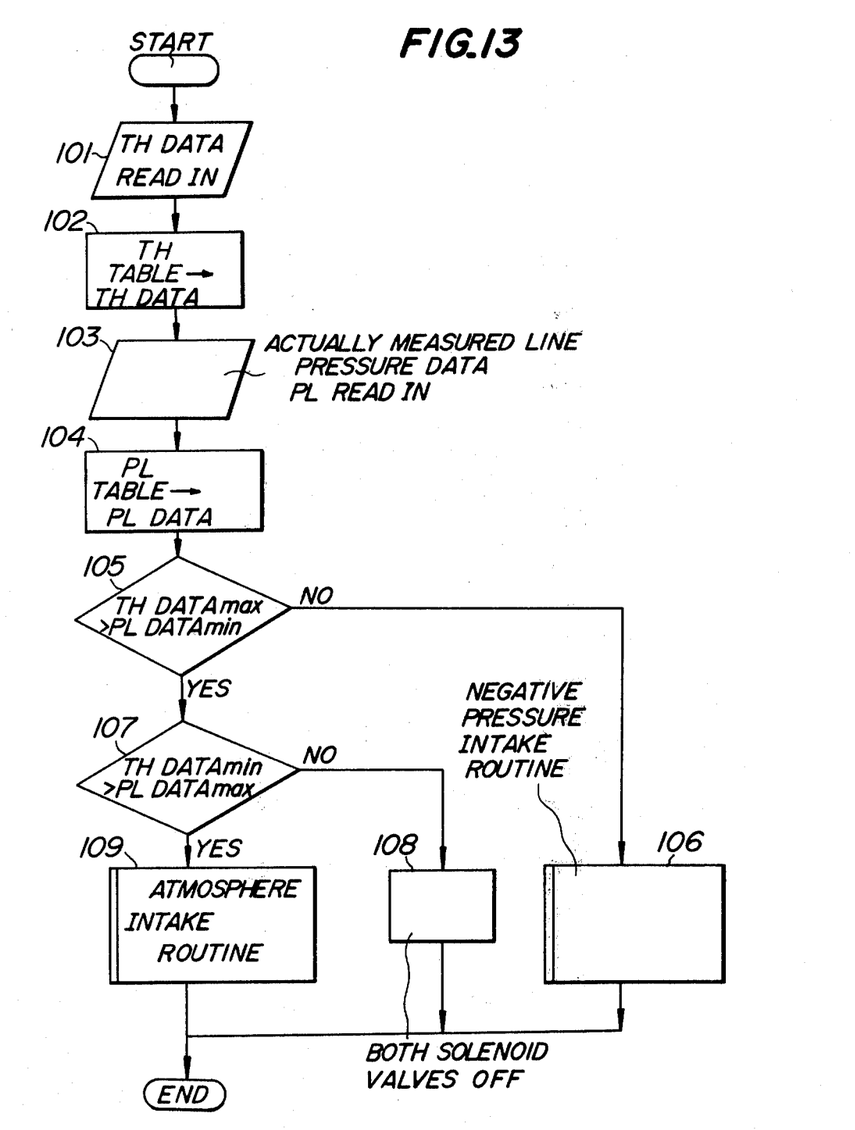
FIGS. 13 to 15 are flow charts showing the control programs of the line pressure control device shown in FIG. 12.

FIG. 12 shows an embodiment of the device according to the present invention constructed by using a microcomputer. The device in this embodiment comprises a microprocessor (MPU) 50, an input/output interface circuit (PiA) 51, a read only memory (ROM) 52 and a random access memory (RAM) 53. The control program shown in FIG. 13 is stored in the memory of the ROM 52, thereby to effect digital controlling which will be explained below. An actually measured line pressure signal (analog signal) and a throttle opening degree (engine load) signal (analog signal) from the line pressure sensor 5 and the throttle sensor 7 are converted into digital signals, respectively, by A/D converters 54, 55, and supply to the PiA 51.

The MPU 50, first in blocks 101, 103 shown in FIG. 13, reads out an actually measured line pressure signal and a throttle opening degree signal from the PiA 51 at regular time intervals of duration $t_A$ as determined by a timing signal (pulse signal or level change signal). Time interval $t_a$ is determined from a time interval $t_B$ derived from a timer 56. The MPU 50 writes the actually measured line pressure signal and throttle opening degree signal in the RAM 53. As a result, the throttle opening degree signal and the actually measured line pressure signal are supplied to the RAM 53 every time interval $t_A$ which can be variably set at the program. While it is common to use the signal from the timer 56 as an interruption signal and to carry out a constant timing function by the MPU 50 in response to the timing signal, it is also possible to generate a signal similar to that provided by the timer 56 by means of a software timer in the MPU 50 in order to provide constant time functions.

Figure 14:
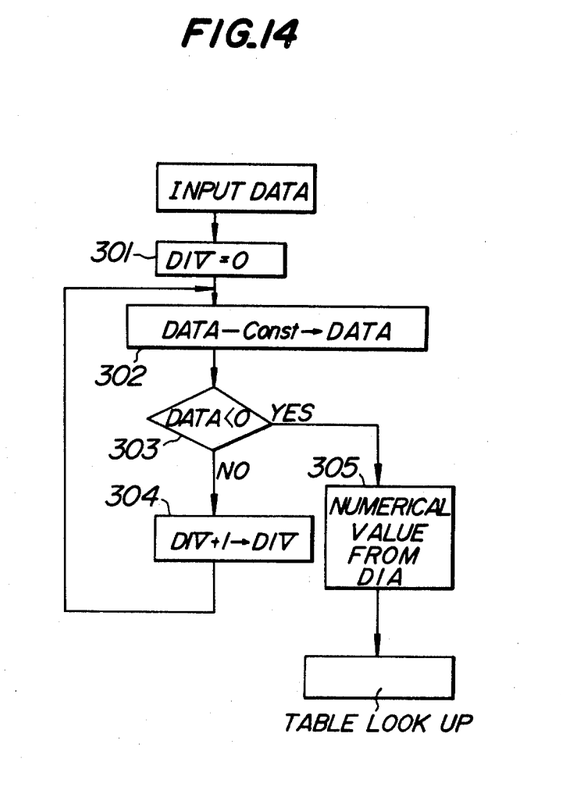
Figure 17:
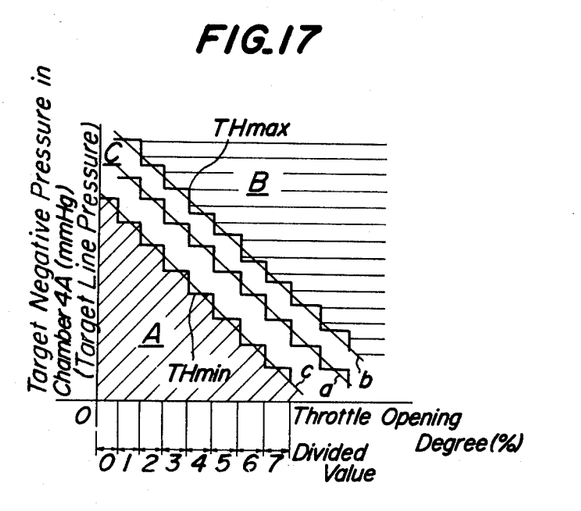
FIG. 17 is a graph representing a table of the target line pressure values corresponding to the divided values of an input signal representing throttle opening degree.

In a block 102 the MPU 50 determines which divided value (e.g., 1 through 7 as shown in FIG. 17) the input value of the throttle opening degree stored in the RAM 53 corresponds to. This determination is carried out by the control program shown in FIG. 14 as follows. Initially, in a block 301, the previously determined divided value (stored in the memory position DIV of the RAM 53) is reset to zero. Then, in a block 302, a predetermined value corresponding to a division width is subtracted from the input throttle data value, and the resulting difference value is stored in the memory position DATA of the RAM 53. This value is compared with zero in a block 303. If, for example the input throttle data corresponds to the divided value 2, the difference value will be larger than zero, so that the control program proceeds to a block 304 in which the value 1 is set in the memory DIV of the RAM 53. The control program then returns back to the block 302 again, so that the predetermined value is again subtracted from the above mentioned difference value stored in the RAM 53, and the new difference value is stored in the RAM. This difference value is compared with zero in the block 303, and in the above mentioned example wherein the throttle data corresponds to the divided value of 2, the difference value will be still larger than zero, so that the value 2 is set in the memory position DIV of the RAM 53 in the block 304. The control then again returns to the block 302. The predetermined value is then again subtracted from the previous difference value stored in the RAM 53. In case of the above mentioned example, the subtracted result will become smaller than zero, so that the control proceeds to block 305 from the block 303. In block 305, the value previously stored in the memory device DIV of the RAM 53, is read out as the divided value. In the case of the above mentioned example, the value 2 is read out as the divided value.

In accordance with the thus determined divided value, from a table of the target line pressure values previously stored in the ROM 52, the corresponding target upper limit line pressure value and the target lower limit line pressure value are read out by a table lookup system, respectively. FIG. 17 is a graph representing the table target line pressure values corresponding to the divided values determined for the throttle opening degree. Therefore, a dead zone ($TH_{max} - TH_{min}$) having a predetermined width on both sides of the target line pressure signal can be obtained.

In the block 104 of FIG. 13, in the same manner that the dead zone is provided for the target line pressure value as described above a dead zone is provided for the actually measured line pressure value PL read out from the RAM 53. From a table of the actually measured line pressure previously supplied to the ROM 52, the corresponding actually measured upper limit line pressure value $PL_{max}$ and the actually measured lower limit line pressure value $PL_{min}$ are read out by a table lookup system and a dead zone ($PL_{max} - PL_{min}$) having a predetermined width on both sides is also set for the actually measured line pressure signal. An alternative system of setting this dead zone, would be to use a system of subtracting a predetermined value from a read-in data value instead of the above described table lookup system. The latter system, however, is inconvenient because the same dead zone is always set to the read-in data value. On the other hand, the former system is advantageous because the dead zone width can freely be varied for every read-in data value according to the setting.

Figure 15:
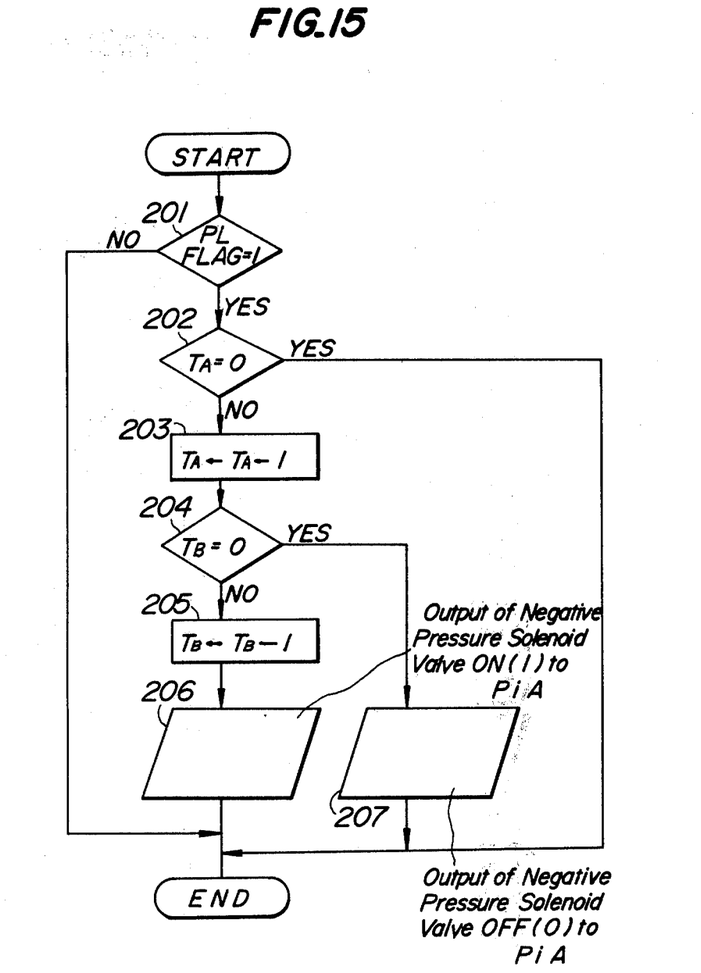

In the block 105 then, the signals $TH_{max}$ and $PL_{min}$ obtained as described above are compared with each other, and when $PL_{min} > TH_{max}$, the program control proceeds to the block 106 and a negative pressure intake routine is performed, which will be explained with reference to FIG. 15 below. When $PL_{min} < TH_{max}$, the control proceeds to a block 107, where $TH_{min}$ is compared with $PL_{max}$, and when $PL_{max} > TH_{min}$, that is, when the actually measured upper limit line pressure is greater than the target lower limit line pressure, the control program proceeds a block 108, so as to close both the solenoids 9, 10 (refer to FIG. 2) and not to change the line pressure by keeping the present pressure in the chamber 4A of the diaphragm device 4 (refer to FIG. 2). When $PL_{max} < TH_{min}$, the control program proceeds to a block 109 and an atmosphere intake routine, which will be explained below, will be carried out. At the same time when the blocks 106, 109 are selected by the blocks 105, 107, respectively, the line pressure control flag PL FLAG is set to 1, and PL FLAG is reset to 0 when the block 108 is selected.

The negative pressure intake routine will be explained with reference to FIG. 15.

Figure 16:
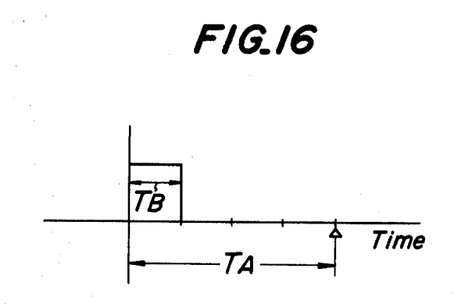
FIG. 16 is a schematic diagram showing a solenoid driving pulse signal.

When an interruption signal is delivered at each time interval $t_B$ from the timer 56 (refer to FIG. 12), the execution is started. In block 201, it is detected whether PL FLAG is 1, that is, whether the negative pressure intake routine has already been started when the negative pressure intake instruction from the block 105 shown in FIG. 13 occurs, the PL FLAG will be set at 1. When the PL FLAG is 1 the control program proceeds to a block 202, and it is determined whether the reference time $T_A$ is zero or not. Assuming that the time $T_A$ is a numerical value corresponding to a certain time interval times the predetermined time interval signal from the timer 56 (refer to FIG. 12) and this value $T_A$ is equal to the afore-mentioned time interval $t_A$ for the sake of, for example, is equal to 4 as shown in FIG. 16, then $T_A \neq 0$ initially. Accordingly the control program proceeds to a block 203, where $T_A - 1 = 3$ is calculated and this value is stored in the RAM 53. Then, in a block 204, it is determined whether the time interval $T_B$ for switching on the negative pressure solenoid valve is zero or not. The time interval $T_B$ is a negative pressure intake time determined in accordance with the deviation δ from the negative pressure intake time table corresponding to the magnitude of the deviation δ previously stored in the ROM 52. Assuming that $T_B$ is equal to the above-mentioned time interval $t_B$ for the sake of simplicity and is equal to 1, for example, as shown in FIG. 16, then, $T_B \neq 0$ initially. Accordingly the control program proceeds from the block 204 to a block 205, where $T_B - 1 = 0$ is calculated, and the calculated value is stored in the RAM 53 and a driven signal for the negative pressure solenoid valve 9 is generated from in block 206.

When the next interruption signal is delivered from the timer 56, it is again determined whether PL FLAG is 1 or not in the block 201, and whether $T_A$ is zero or not in the block 202. In the above described example, $T_A$ is 3 from the preceding step and $T_B$ is 0 from the preceeding iteration through the routine, so that the control program proceeds to the block 207, where the signal for driving the negative pressure solenoid valve to its OFF state is generated. Thus, the negative pressure solenoid valve driving signal, which is generated from the block 206, is maintained for a time interval in accordance with the deviation δ, for example, for an interval $T_B = 1$ as shown in FIG. 16. Drive circuit 57 shown in FIG. 12 is actuated in accordance with the signal and the negative pressure solenoid valve 9 is opened for time interval equal to $T_B$. The control program thereafter repeats from the block 202 to 203, 204, 207 until $T_A$ becomes zero completing this cycle. At the next time $t_A$ the cycle is similarly repeated until PL FLAG is reset to 0 at the block 108. In this manner the opening and closing operation of the negative pressure solenoid valve 9 is controlled.

The atmospheric pressure intake routine 109 shown in FIG. 13 is carried out in the same manner as the afore-mentioned negative pressure intake routine. The atmospheric pressure solenoid valve 10 is opened by the drive circuit 58 shown in FIG. 12 by a similar method so that opening time of the valve 10 controlled in accordance with the deviation δ.

In the embodiment, of FIG. 12 the dead zones are provided on both sides of the target line pressure value and the actually measured line pressure value. The target line pressure and the actually measured line pressure as values are compared with each other and their difference is used as a deviation, so that function and effect similar to the previously described embodiments can be obtained.

In every one of the above embodiments, the dead zones are provided on both sides of the target line pressure and the actually measured line pressure. Alternatively dead zones may be provided on both sides of only one of the target line pressure or the actually measured line pressure, and the objects of the invention can be attained. However, in the described embodiments with the dead zones provided on both the target line pressure and the actually measured line pressure and wherein the upper limit value is compared with the lower limit value, which values determine the dead zones, it becomes possible to reduce the dead zone widths to the half the width that would otherwise be required and the stability of the control system can be maintained while maintaining the line pressure control with high precision. With a dead zone provided on only one of the target line pressure and the actually measured line pressure it is necessary to make the dead zone width twice as wide in order to positively attain, can be stability of the control system. But such a system has the disadvantage that control precision of the line pressure is reduced by half as compared with the above described preferred embodiments. When this fact can be ignored, the latter control device is advantageous because one system for setting a dead zone for the target line pressure signal or the actually measured line pressure signal can be omitted, and thus the control system can be simply constructed with minimum expenses.

What is claimed is:

1. In an automotive vehicle having an engine and an automatic transmission coupled to said engine, said automatic transmission having a plurality of friction elements selectively actuated to effect speed changes in said transmission and hydraulic means hydraulically connected to said friction elements for applying fluid under pressure to said friction elements, an engine load sensor operatively associated with said engine for generating a signal corresponding to the load on said engine, a line pressure adjusting valve operatively associated with said hydraulic means for controlling the pressure of the fluid applied to said friction elements, a hydraulic pressure adjusting valve operatively associated with said line pressure adjusting valve and with said engine load sensor for producing a controlled pressure acting on the line pressure adjusting valve and adjusting the pressure of the fluid applied to said friction elements to a value corresponding to the engine load through the line pressure adjusting valve, the improvement comprising: circuit means connected to said engine load sensor for generating a target line pressure signal in response to and corresponding to the load signal generated by the engine load sensor, a line pressure sensor operatively associated with said hydraulic means for generating an actually measured line pressure signal corresponding to the pressure of the fluid applied to said friction elements, a converter means connected to at least one of said circuit means and said line pressure sensor for converting at least one of the target line pressure signal and the actually measured line pressure signal into an upper limit line pressure signal greater than said one of said line pressure signals by a given amount and into a lower limit line pressure signal less than said one of said line pressure signals by a given amount, and a decision circuit means connected to said converter means and to said hydraulic pressure adjusting valve for comparing the upper and lower limit line pressure signals with the other of the target line pressure signal and the actually measured line pressure signal and driving and controlling the hydraulic pressure adjusting valve in accordance with the result of the comparison.

2. In an automotive vehicle as claimed in claim 1, wherein the hydraulic pressure adjusting valve has a driving portion, comprising a diaphragm device having a negative pressure chamber, an atmospheric pressure solenoid valve operatively associated with said diaphragm device for introducing the air into said negative pressure chamber of the diaphragm device and a negative pressure solenoid valve operatively associated with said diaphragm device for supplementing a negative pressure to said negative pressure chamber, the line pressure sensor comprises a sensor connected to said diaphragm device for sensing the negative pressure in the negative pressure chamber, and the decision circuit means is connected to supply a signal to the atmospheric pressure solenoid valve for opening the atmospheric pressure solenoid valve or to the negative pressure solenoid valve to open the negative pressure solenoid valve when said other of the target line pressure signal and the actually measured line pressure signal deviates from a dead zone between the upper and lower limit line pressure signals.

3. In an automotive vehicle as claimed in claim 2, wherein the decision circuit means comprises circuit means for detecting deviation of the actually measured line pressure signal from the target line pressure signal, and wherein the decision circuit means supplies a signal to the negative pressure solenoid valve to open the negative pressure solenoid valve or to the atmospheric pressure solenoid valve to open the atmospheric pressure valve for a time interval determined in accordance with the detected deviation.

4. In an automotive vehicle having an engine, an automatic transmission coupled to said engine and having a plurality of friction elements selectively actuated to effect speed changes in said transmission and hydraulic means hydraulically connected to said friction elements to apply fluid under pressure to said friction elements, an engine load sensor operatively associated with said engine for generating a signal corresponding to the engine load, a line pressure adjusting valve operatively associated with said hydraulic means for controlling the pressure of the fluid applied to said friction elements, a hydraulic pressure adjusting valve operatively associated with said line pressure adjusting valve for producing a controlled pressure acting on the line pressure adjusting valve and adjusting the pressure of the fluid applied to said friction elements to a value corresponding to the load on said engine through the line pressure adjusting valve, the improvement comprising: circuit means connected to said engine load sensor for generating a target line pressure signal in response to and corresponding to the load signal generated by the engine load sensor, a first converter means connected to said circuit means for converting the target line pressure signal into a target upper limit line pressure signal and a target lower limit line pressure signal which are greater and less, respectively, than said target line pressure signal by given amounts, a line pressure sensor operatively associated with said hydraulic means for generating an actually measured line pressure signal corresponding to the pressure of the fluid applied to said friction elements, a second converter means connected to said line pressure sensor for converting the actually measured line pressure signal from the line pressure sensor into an actually measured upper limit line pressure signal and an actually measured lower limit line pressure signal which are greater and less, respectively, than said actually measured line pressure signal by given amounts, and a decision circuit means connected to said first and second converter means and to said hydraulic pressure adjusting valve for generating a signal for controlling the hydraulic pressure adjusting valve to decrease the line pressure when the actually measured lower limit line pressure signal exceeds the target upper limit line pressure signal by comparing the target upper limit line pressure signal with the actually measured lower limit line pressure signal and generating a signal controlling the hydraulic pressure adjusting valve to increase the line pressure when the actually measured upper limit line pressure signal is lower than the target lower limit line pressure signal by comparing the target lower limit line pressure signal with the actually measured upper limit line pressure signal.

5. In an automotive vehicle as claimed in claim 4, wherein the hydraulic pressure adjusting valve has a driving portion comprising a diaphragm device having a negative pressure chamber, an atmospheric pressure solenoid valve operatively associated with the diaphragm device for introducing the air into said negative pressure chamber, and a negative pressure solenoid valve operatively associated with the diaphragm device for supplementing a negative pressure to said negative pressure chamber, and the decision circuit means supplies a signal to the negative pressure solenoid valve to open the negative pressure solenoid valve when the actually measured lower limit line pressure signal is larger than the target upper limit line pressure signal and supplies a signal to the atmospheric pressure solenoid valve to open the atmospheric pressure solenoid valve when the actually measured upper limit line pressure signal is smaller than the target lower limit line pressure signal, respectively.

6. In an automotive vehicle as claimed in claim 4, wherein the decision circuit means comprises a circuit for detecting deviation of the actually measured line pressure signal from the target line pressure signal, and the decision circuit means supplies a signal to open the negative pressure solenoid valve or the atmospheric pressure solenoid valve for a time interval determined in accordance with said deviation.

* * * * *